INVENTORS
LUIGI BERTONI
GIANCARLO PIZZAMIGLIO
RENATO FAVA
GIORDANO CIMAROSTI
BY
Stevens, Davis, Miller & Mosher
ATTORNEYS

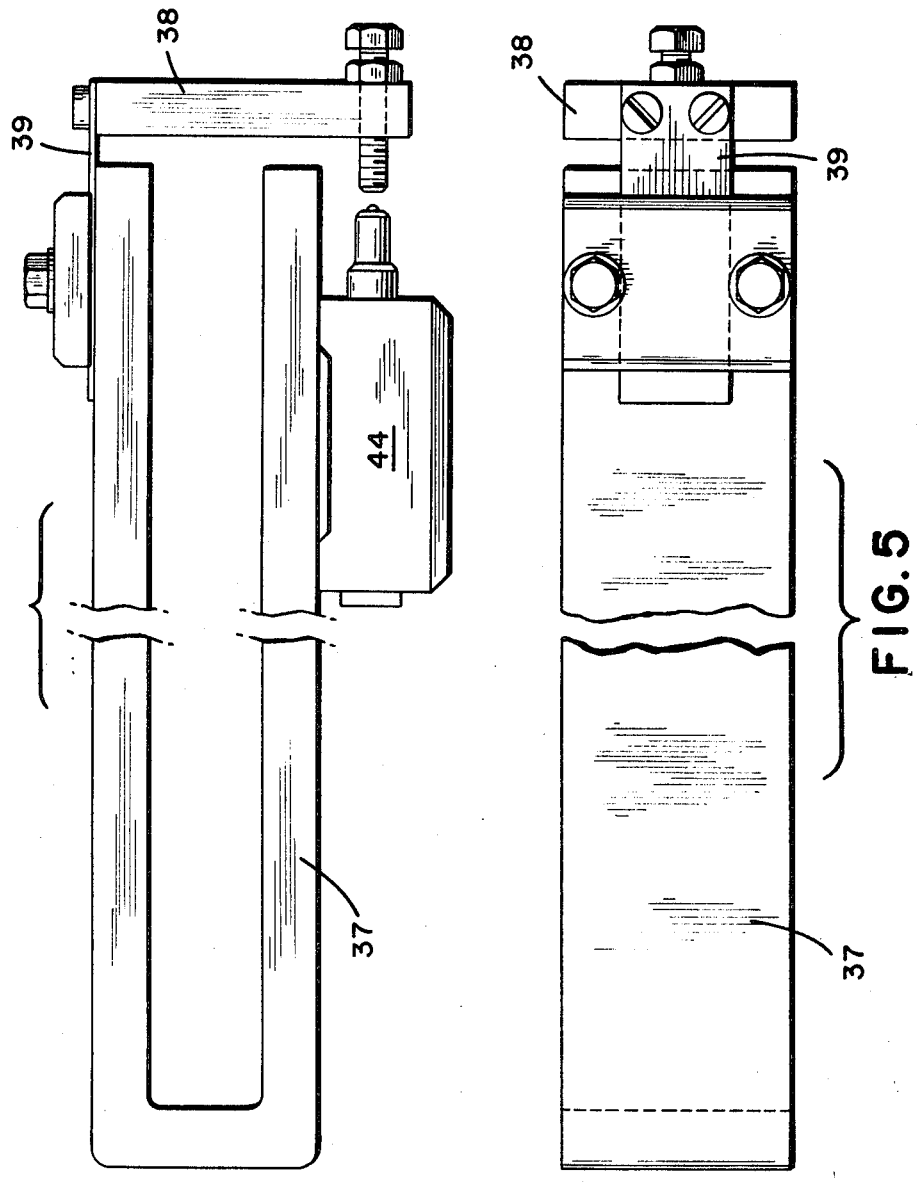

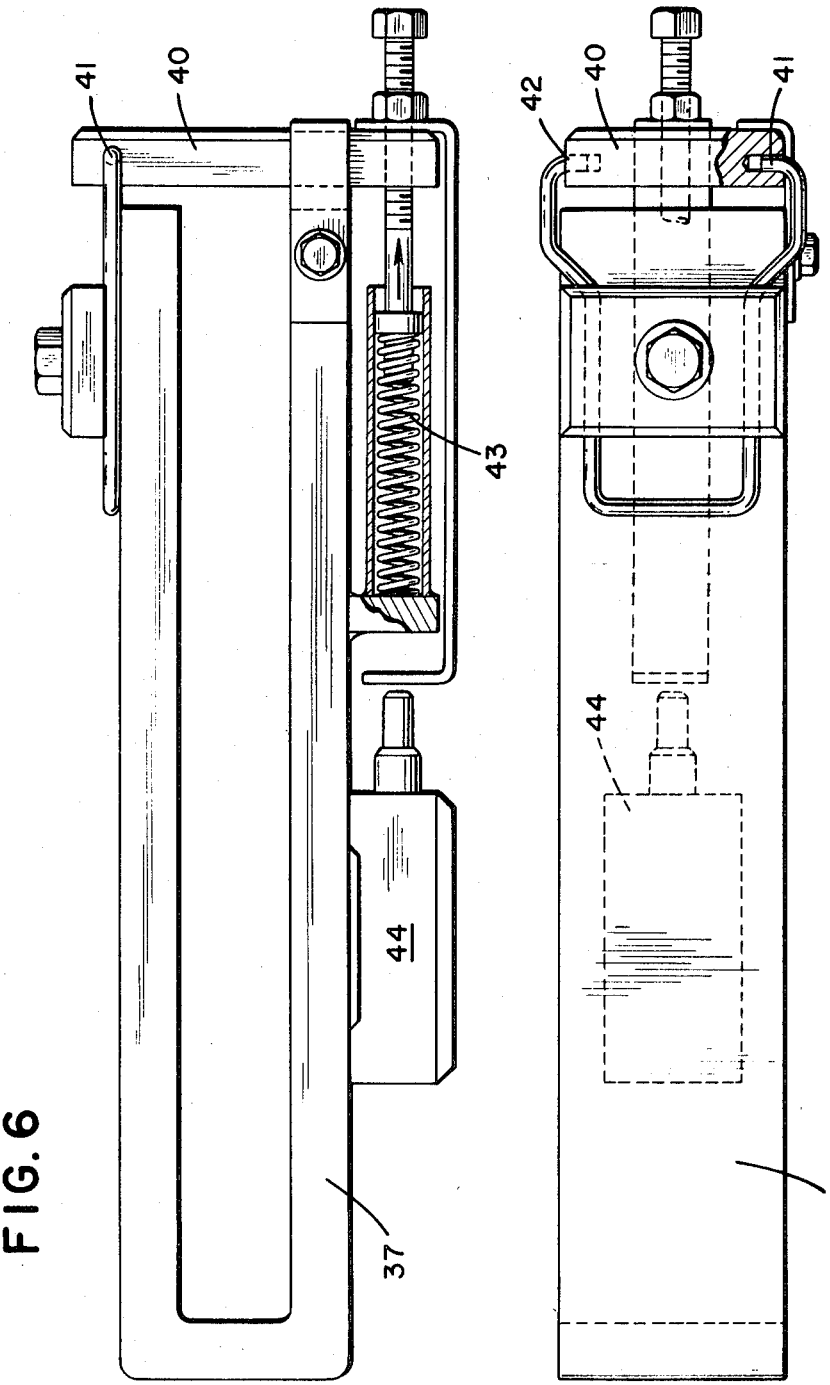

United States Patent Office 3,734,848
Patented May 22, 1973

3,734,848
EQUIPMENT FOR THE CONTROL AND THE REGULATION OF AN ALKALI-CHLORINE ELECTROLYSIS PLANT WITH MERCURY-CATHODE CELLS
Luigi Bertoni, Giancarlo Pizzamiglio, and Renato Fava, Mantova, and Giordano Cimarosti, Roverbella, Italy, assignors to Montecatini Edison S.p.A., Milan, Italy
Filed Mar. 25, 1971, Ser. No. 128,070
Claims priority, application Italy, Mar. 25, 1970, 22,407/70
Int. Cl. C22d 1/04; B01k 3/00; B23p 1/12
U.S. Cl. 204—220
8 Claims

ABSTRACT OF THE DISCLOSURE

Equipment for the operation of an alkali-chlorine electrolysis plant of the type employing series-connected mercury cathode cells comprising, for each cell, a device responsive to brine flow variations for monitoring current decreases at the first anodic descent bar of the cell, a device for monitoring overloads at each of the anodic ascent bars, a device regulating the cathodic mercury delivery and an instrument for metering the delivery of brine to each cell. These devices are arranged to regulate the inter-electrode gaps in the cells and to disconnect the cells when necessary.

---

Figure 1:
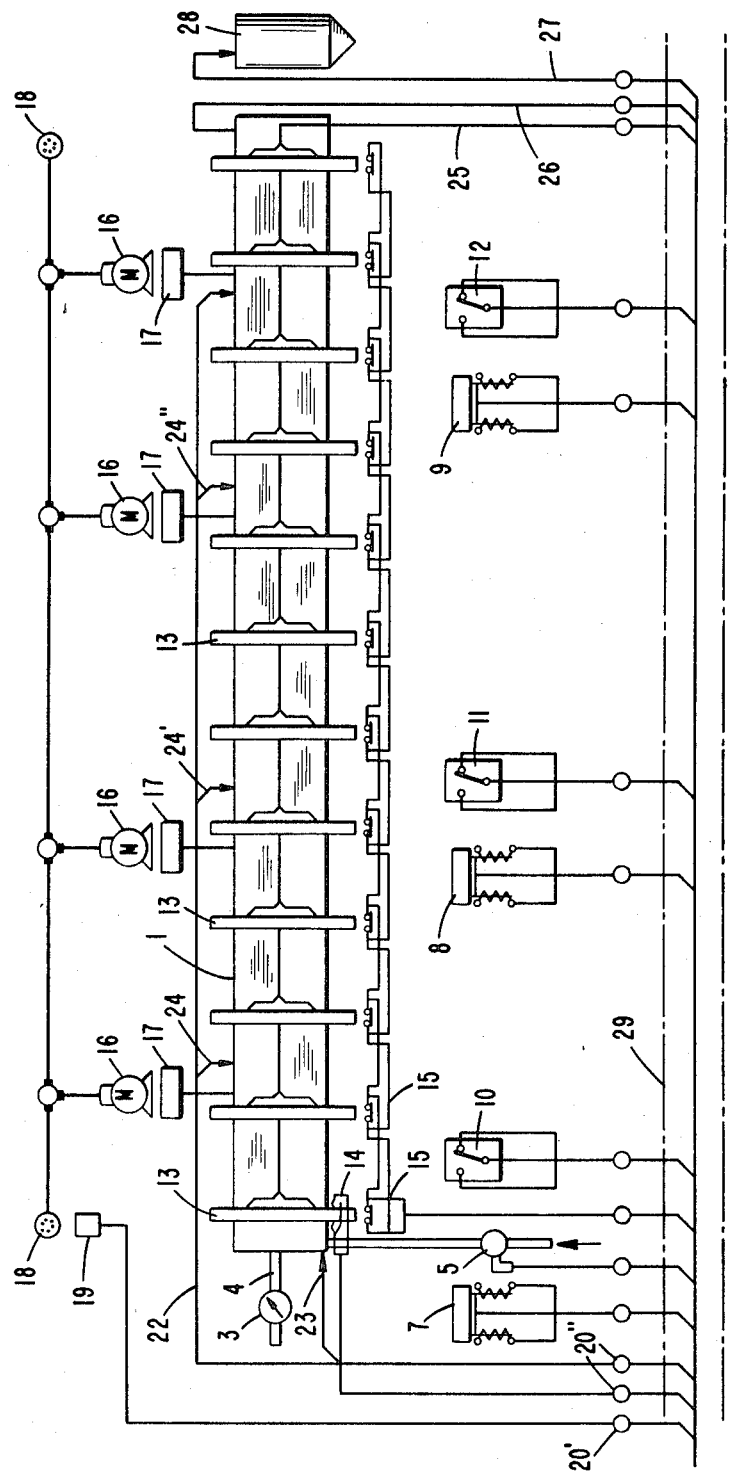

This invention relates to equipment for the operation of an alkali-chlorine electrolysis plant and in particular to plants employing alkali-chlorine cells of the type having a mercury-cathode. Alkali-chlorine plants, particularly plants employing cells containing mercury cathodes, are presently provided with minimal instrumentation. Only the detection, and sometimes the recording, of the anode voltages and the caustic soda temperatures are usually carried out in these plants.

The trend toward larger cells and the use, on an industrial scale, of metal anodes instead of the traditional graphite anodes, now permits very high capacity plants to be constructed. However, in such plants, it is more delicate and difficult to maintain each cell in its optimum operating condition and, in addition, operation of these cells is more hazardous than in conventional installations.

An object of the present invention is to provide equipment for the control and regulation of the operating conditions of an alkali-chlorine electrolysis plant employing mercury-cathode cells, said equipment controlling and regulating, rather than merely detecting, the most significant electrical, physical and chemical quantities of each cell. Another object of the invention is to provide equipment which carries out said control and regulation at very short time intervals, in order to obtain good electrolysis yield and power efficiency.

A further object of the invention is to provide equipment which reduces or even eliminates at its inception irregular cell functions which can lead to dangerous situations and significant damage or failure of a cell.

Still another object of the present invention is to provide equipment which, through the use of automatic or semi-automatic devices, permits a reduction in the personnel required to operate the cell room and to improve safety conditions.

A still further object of the present invention is to provide equipment which makes use of very simple and low priced devices without however jeopardizing the effectiveness and the safety of the equipment.

Yet another object of this invention is to provide equipment which will allow full plant automation, if required.

These and other objects, which the following detailed description will clarify, are advantageously achieved by equipment for the control and regulation of an alkali-chlorine electrolysis plant of the type employing, in particular, mercury-cathode cells electrically connected in series. The equipment according to this invention comprises, for each cell, a set of devices for detecting the cell disturbances, said set including a device for monitoring a current decrease at the first anodic ascent bar, said device being of the electromagnetic, electronic (specifically transistorized) or magnetic induction type; devices similar to the previous ones, associated with each anodic ascent bar, for monitoring overloads; a pressure switch assembly located at the delivery side of the cathodic mercury pump; and an instrument, preferably a rotameter for metering the delivery of the brine entering the cell. This set of devices is electrically connected to circuits for the automatic operation of suitable motors provided for regulating the inter-electrode gaps, and with other circuits for disconnecting the cell. These devices, and others are terminated at a cell panel provided with signal and alarm instruments as well as operation pushbuttons, in particular, for actuating said regulation motors and effecting disconnection of said cell, said cell panels being connected with a main control and signalling desk, it too being provided with alarm devices and instruments for metering the voltage and currents of the cell anodic ascent bars, the temperatures of brine and caustic soda, the hydrogen percentage in the chlorine gas, the connection of said main control and signalling desk with each cell being obtained through a change-over assembly, said main control and signalling desk being adapted for connection with a electronic computer.

Figure 2:
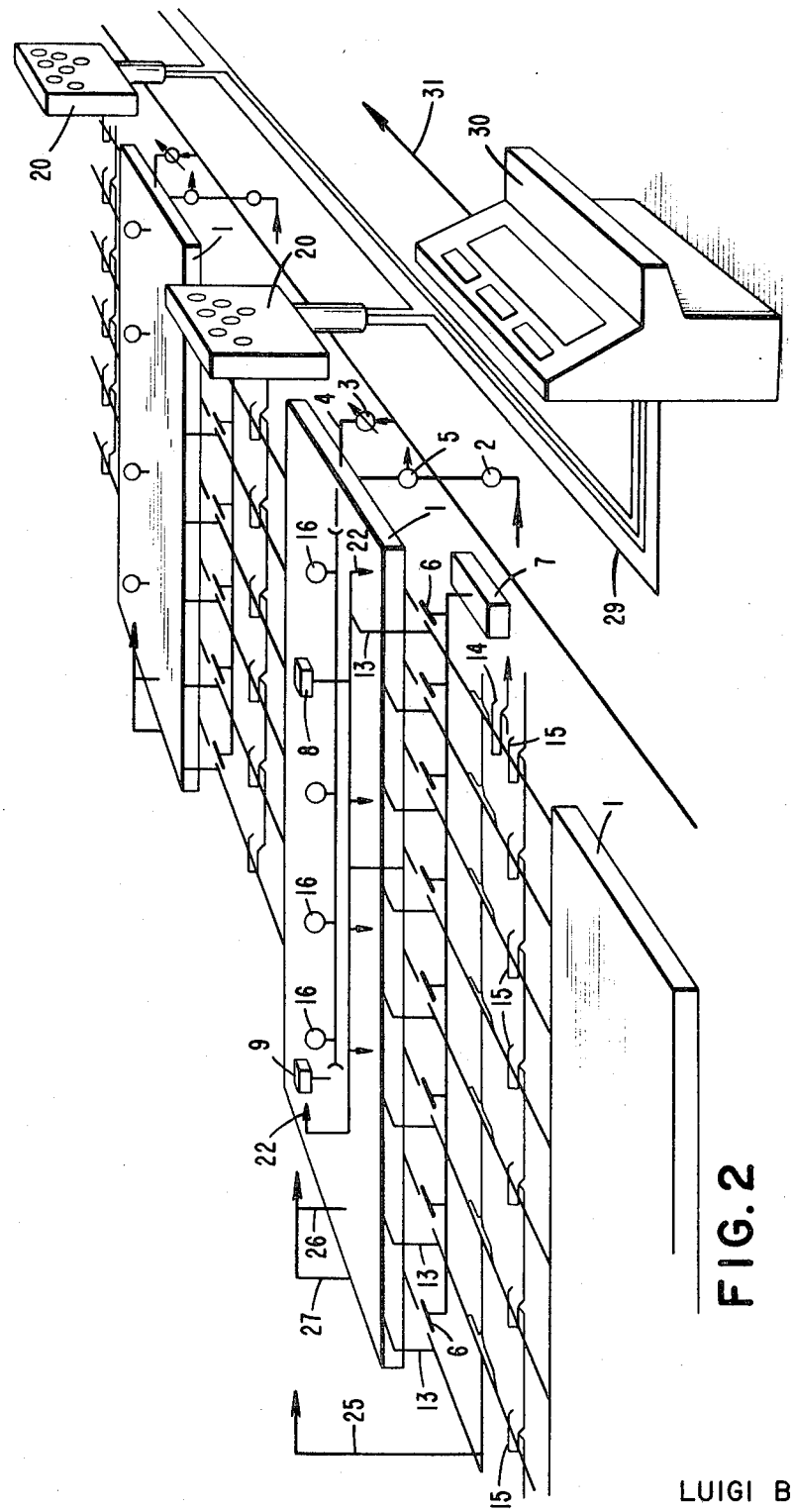
Figure 3:
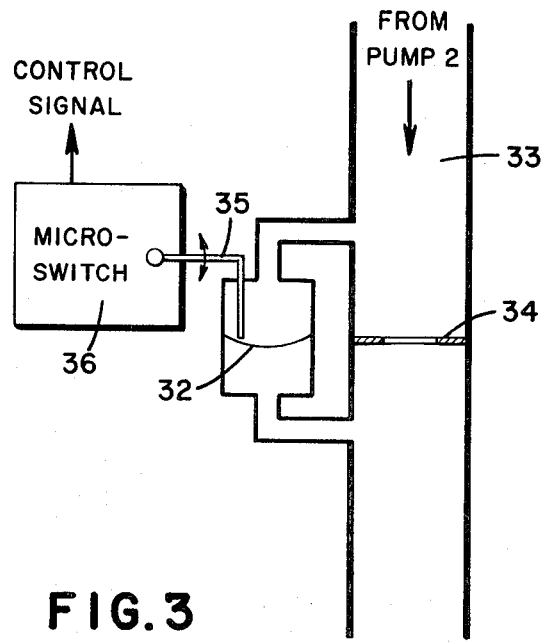
Figure 8:
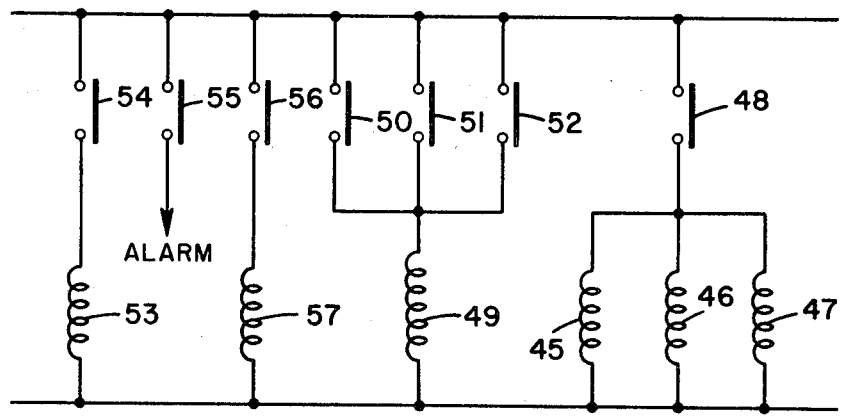

The invention will be described hereinafter in more detail by reference to the enclosed drawings wherein the same or equivalent parts have the same reference numerals, and wherein FIG. 1 shows schematically the electrical connections of a cell instrumented according to this invention, FIG. 2 shows schematically an alkali-chlorine plant comprising the present invention, FIG. 3 shows schematically a device for controlling the mercury delivery to a cell, FIG. 4 shows a plan view and FIG. 5 a side view of a device for controlling the flowing-through current of the anodic bars of the cell, FIG. 6 shows a plan view and FIG. 7 a side view of another embodiment of the device referred to in FIGS. 4 and 5, FIG. 8 shows a diagram of circuitry for controlling the cell operation.

Referring to FIGS. 1 and 2, 1 designates the tank of an alkali-chlorine electrolytic cell having a mercury cathode. The cathode mercury is conveyed to the cell inlet by means of a pump 2 while the brine enters the tank through a conduit 4, delivery of the brine being metered by instrument 3, which preferably consists of a rotameter.

The lack of mercury or brine, like their decrease, can create serious hazards, as for example the forming of explosive mixtures, consequent to the occurrence of the water electrolysis, and the cell may burst with consequent break of the series connection and stoppage of the whole plant: therefore, in addition to instrument 3 (which meters the brine delivery), instrument 5 is provided for regulating the mercury delivery while (as hereinafter discussed) other devices are provided which act when disturbances occur in the cell, just as in the case where the mercury or brine is missing or decreased.

Instrument 5 for regulating the mercury delivery is, as shown in FIG. 3, a pressure switch of known type essentially consisting of a sensitive diaphragm component 32 assembled at the delivery side 33 of pump 2. This pressure switch responds to the difference of the pressures upstream and downstream of a calibrated disk 34 placed at the pump outlet, and is provided with a moving element 35 associated with a micro-switch 36. It has been noted that other known devices for regulating the delivery as, for example, those based on the use of floats or the continuity of electric circuits (including a series-connected section consisting of the fluid the delivery of which is to be regulated) are troublesome due to mechanical jamming of the floats, oxidation and dirt collecting on contacts and electrodes, clogging of the pipes, etc.

When the pressure switch detects some disturbance, it induces an alarm signal at the cell where the disturbance has occurred and at the control room. Should the disturbance persist for a pre-determined interval, the pressure switch causes the cell to be disconnected from the electric input by short-circuiting it (the cells of these plants are usually connected in series and are provided with shorting switches as shown at 6), the conveying of air to the concerned cell in order to dilute the explosive mixtures, and the switching over of the chlorine outflow from its primary to its secondary utilization (chlorine scrubbing piping). The emergency operations controlled by the pressure switch are suitably delayed with respect to the alarm, thereby avoiding useless shutdowns in case of transient disturbances during which the work conditions actually remain safe.

The devices used for disconnecting the cell include relay 7 which actuates cell shorting switch 6, electromagnetic valve 8 for changing over the chlorine outflow from its primary to its secondary utilization and electromagnetic valve 9 for conveying dilution air to the cell. FIG. 1 shows adjacent to relay 7, electro-magnetic valves 8 and 9 and the relevant two-position (closing and opening) contacts 10, 11 and 12.

As to the lack of brine, the current decrease taking place at the first of the cell anodic ascent bars 13, has been chosen as the most significant quantity (as known, the alkali-chlorine cells with mercury-cathode are provided with many anodes united in sets supporteed by relevant frames). In fact, the brine becomes exhausted more quickly in this zone than in other cell zones, consequently increasing the bath resistance and decreasing the current. For monitoring this current decrease use is made of electromagnetic, electronic (specifically transistorized) or magnetic induction style devices, which begin functioning when the current in the first anodic ascent bar decreases below a pre-determined value lower than the rated current, said devices controlling the operations in the same way as the pressure switch assembly at the delivery side of mercury pump 2.

In practice, the use of an electromechanical device 14, as shown in FIGS. 4 to 7, has been found particularly advantageous, said device consisting of a magnetic open core 37 placed around the input conductor of the first anodic ascent. The air gap and the core cross section area are dimensioned to provide a linear response to the operating field and to make the influence of external fields negligible. In order to obtain negligible or reduced friction, use is preferably made of a keeper 38 including a leaf spring 39 (FIGS. 4 and 5), or a stiff keeper 40 (FIGS. 6 and 7) pivoted at one end by pivots 41 and 42 and pushed by a return spring 43 at its other end. The magnetic circuit is never closed, as stops are provided for the travel end of the keepers.

The calibration of the device actuating value can be modified by changing the length of the air gap or by preloading the counter spring with a different strength.

A micro-switch 44, preferably an airtight type operated by the keeper 38 or 40, is associated with electromagnetic device 14. The monitoring of overloads on anodic ascent bars 13 is of paramount importance for the preservation of the anodes. In consequence of the more and more exact calibration of the inter-electrodic gap required, it has been found suitable to detect the short circuits directly through the primary quantities, namely the current. This is important mainly in the case of metal anodes, since in that event current variations are much higher than the current variations occurring when the anodes are made of graphite, assuming the voltage variations to be equal.

Devices similar to device 14 provided for metering current decreases through the first anodic ascent bar, but differently calibrated, are used to detect short circuits. Electromagnetic devices 15, arranged on each anodic ascent bar 13, are advantageously used for this purpose. The disturbance resulting from a short circuit can arise in different ways within the same plant and differently develop with different plants. In any case, such disturbances correspond to large current increases at the concerned anodic ascent bar and advantage is taken of this phenomenon to calibrate protection device 15 at a safe value.

The displacements of the frames carrying the various anode sets of the cell and particularly their quick lifting when short circuits occur, are obtained through a device of the type specified in copending U.S. application Ser. No. 808,215 filed Mar. 18, 1969, now U.S. Pat. No. 3,616,448.

Single-speed induction motors are provided for said displacements and associated with speed reducers 17 and can be singly or simultaneously operated. The feeding times of motors 16 are controlled by time-lag devices. The input circuits of the motors terminate at sockets 18 which receive their power through plugs 19.

FIG. 8 is a schematic diagram showing circuitry for disconnecting a cell. Coil 45 in relay 7 (see FIG. 1), coil 46 in electromagnetic valve 8 and coil 47 in electromagnetic valve 9 are connected in parallel with the power source through automatic switch 48 which is operated by coil 49, the latter being connected in series with the parallel circuit of contacts 50, 51 and 52. Contact 50 is operated by coil 53 which is energized when contact 54 is closed as a consequence of the operation of an electromagnetic device 15. Contact 51 is operated as soon as pressure switch 5 starts its function as a result of a fall in mercury pressure. Contact 52 is closed on lack of brine. Alarm contact 55 closes following the energizing of coil 53. Contact 56 closes on energizing of coil 53 thus causing the energizing of coil 57 which controls the operation of motor 16 (FIGS. 1 and 2) associated with the frame carrying one or several anodes subjected to a short-circuit overload.

The above specified circuits are connected as references 20', 20'' show, to cell panel 20 equipped with push-button for controlling mercury pump 2; relay 7 which activates shorting switch 6; electromagnetic valves 8, 9, for respectively changing over the chlorine flow from one to the other utilization and conveying dilution air to the cell, as well as alarm silencing push-buttons (FIG. 2).

Moreover, the cell comprises circuit 22, for metering the voltage between points 23 (cathode) and 24, 24', 24'' . . . (anodes); circuit 25 for metering the currents of the anodic ascent bars (said metering is carried out by detecting a voltage drop on each anodic ascent bar and leading it to a suitable instrument); circuit 26 (preferably employing thermal resistors, thermo-couples and the like) for metering the temperature of the brine leaving the cell; circuit 27 (also employing thermal resistors or thermo-couples) for metering the temperature of the caustic soda leaving amalgam decomposer 28 of the cell, and a device (not shown) for metering the delivery of the water for the caustic soda formation.

The various conductors, coming from cell panel 20 or directly from the relevant circuits, terminate at one set of cables 29 used for connecting main desk 30 (FIG. 2) with all cell panels 20 (i.e. with the circuits of the relevant cells, in practice). This connection is carried out by a change-over device (not shown in the figure), including push-buttons and auxiliary relays, which permits the connection of each cell with main desk 30. The connection with the selected cell is made by an operator or in automatic and cyclical sequence.

When operating automatically, main desk 30 is cyclically connected with all the cells by means of a scanning device. In consideration of the number of the cells, the frequency with which the connections with a defined cell are to be performed and, consequenlty, the duration of each connection, mechanical, pneumatic or electronic units are used for the program and changeover functions. Main desk 30 can be connected with an electronic computer, through connection 31, in order to obtain a very high or even full automation of the plant.

Main desk 30 embodies at least three instruments for respectively indicating the temperatures of caustic soda and brine, the currents at the anodic ascent bars and the cell voltage. Each instrument can be used for each of the cells, being connected to the relevant previously specified circuits through a change-over operation. Main desk 30 is also equipped with alarm and signal warning lights as well as with a board of pushbuttons for the selection of the cell to be controlled, the selection of voltages, currents, temperatures, the lifting or lowering operation of motors 16 and speed reducers 17, singularly or contemporaneously, the operation of mercury pump 2, the actuation of shorting switch 6, the chlorine electromagnetic valves 8 and the dilution air electromagnetic valves 9.

Push-buttons for changing the control over a computer are also available. Main desk 30 has moreover continuous operation analyzers of the hydrogen content in the chlorine, with alarms for signalling when the hydrogen content exceeds predetermined limits. The present equipment therefore permits the equipping of each cell with a set of primary devices, continuously operating and able to control the cell (automatically or on operator's action) as well as, in marginal cases, to cut off the cell from the battery, remote control being given to an operator stationed in a control room or to an electronic computer by means of pre-arranged programs.

Obviously, various modifications and alternative, in addition to the already specified ones, equivalent from the functional and structural viewpoints, can be brought to the above illustrated embodiment without exceeding the scope of the invention.

What is claimed is:

1. Equipment for the control and regulation of an alkali-chlorine electrolysis plant employing mercury-cathode cells electrically connected in series comprising, for each cell, a set of devices for detecting cell disturbances, said set including
    (a) a first electromagnetic device comprising a magnetic open core placed at the first anodic ascent bar of said cell for monitoring current decreases,
    (b) a second electromagnetic device for monitoring overloads placed on each anodic ascent bar of said cell and differently calibrated with respect to said first device,
    (c) a pressure switch coupled to a mercury pump for regulating the cathodic mercury delivery, and
    (d) a rotameter for metering the delivery of the brine entering the cell, said set of devices being electrically coupled to circuits acting on a motor frame for the automatic regulating of the inter-electrode gaps of said cell and with circuits for disconnecting said cell, said set of devices being connected to a cell panel provided with signalling alarms and push-button for actuating said regulating motor frame and effecting disconnection of said cell, said cell panels being connected with a main control and signalling desk; said main desk being further provided with instruments for metering directly the voltage and the currents of the cell anodic ascent bars and the temperatures of the electrolytic bath, the connection of said main desk with each cell panel being achieved through a changeover assembly.

2. Equipment according to claim 1 wherein said device for monitoring the current decreases at the first anodic ascent bar and said devices for monitoring the overloads comprise a magnetic open core placement around the relevant input conductor, said devices being provided with a keeper for operating a micro-switch.

3. Equipment according to claim 2, wherein said keepers of the electromagnetic devices are leaf springs.

4. Equipment according to claim 1, wherein said pressure switch for regulating the cathodic mercury delivery comprises a diaphragm component assembled at the delivery side of said mercury pump, said switch responding to the difference between the pressures upstream and downstream of a calibrated disk placed at the delivery side of said mercury pump.

5. Equipment according to claim 1, wherein said motor frame for regulating the inter-electrode gaps comprise single-speed induction motors associated with speed reducers, said induction motors being fed through time-lag devices.

6. Equipment according to claim 1, wherein said circuits provided at each cell for disconnecting said cell include a relay for actuating a corresponding shorting switch which cuts off the cell input, a first electromagnetic valve for conveying dilution air to the cell, and a second electromagnetic valve for changing over the chlorine outflow from the cell to chlorine scrubbing piping.

7. Equipment according to claim 1 wherein said main desk is provided with instruments for respectively metering the voltage, the currents at the cell anodic ascent bars and the temperatures of brine and caustic soda, is further provided with means for transferring these instruments to the relevant detection circuits of each cell.

8. Equipment according to claim 1, wherein said change-over assembly consisting of a scanning device.

References Cited

UNITED STATES PATENTS

| | | | |
|---|---|---|---|
| 3,531,392 | 9/1970 | Schmeiser | 204—225 |
| 3,574,073 | 4/1971 | Ralston, Jr. | 204—225 X |
| 3,594,300 | 7/1971 | Schafer | 204—225 |
| 3,409,519 | 11/1968 | Gallone et al. | 204—99 |
| 3,627,652 | 12/1971 | Denora et al. | 204—99 |
| 3,689,398 | 9/1972 | Caleffi | 204—220 |

FOREIGN PATENTS

| | | | |
|---|---|---|---|
| 1,061,755 | 7/1959 | Germany | 204—220 |

TA-HSUNG TUNG, Primary Examiner

D. R. VALENTINE, Assistant Examiner

U.S. Cl. X.R.

204—225, 228